June 22, 1926.

F. D. WILLIAMS 1,589,731

METHOD OF MOTION PICTURE COMPOSITION

Original Filed March 8, 1924

INVENTOR.
Frank D. Williams
BY Nestall and Nallace
ATTORNEYS

Patented June 22, 1926.

1,589,731

UNITED STATES PATENT OFFICE.

FRANK D. WILLIAMS, OF LOS ANGELES, CALIFORNIA.

METHOD OF MOTION-PICTURE COMPOSITION.

Application filed March 8, 1924, Serial No. 697,739. Renewed November 9, 1925.

This invention relates to the art of producing composite pictures wherein a real setting or scene in which action may take place is incorporated with an artificial picture or drawing.

As an illustration of an application of this invention, it is often desired to produce a picture wherein the action takes place in a room having a ceiling. With my invention, the picture may be photographed by employing a set having no ceiling. This photograph may then be associated with an artificial scene showing the ceiling to form a complete composite photograph.

An object of this invention is to provide a method whereby the component parts of a picture may be properly registered to produce a unitary picture and whereby the tones, perspectives and other qualities may be blended so that no lines of demarcation between the parts will be apparent.

Figure 1:
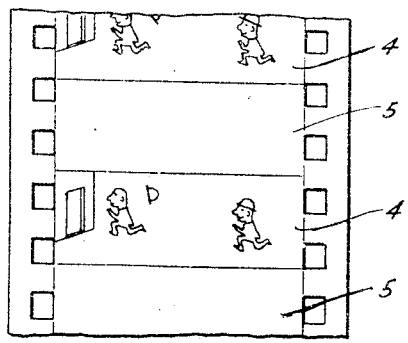
Figure 2:
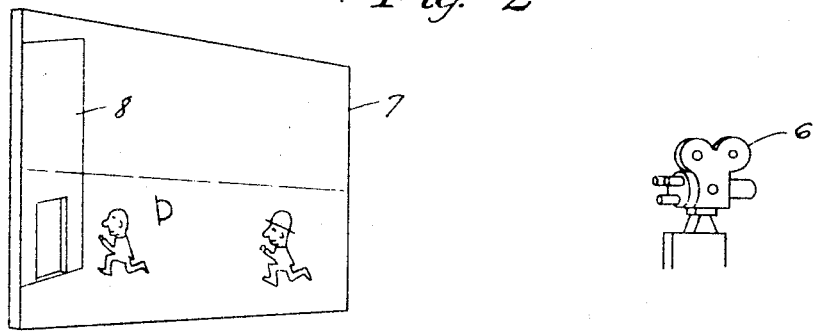
Figure 3:
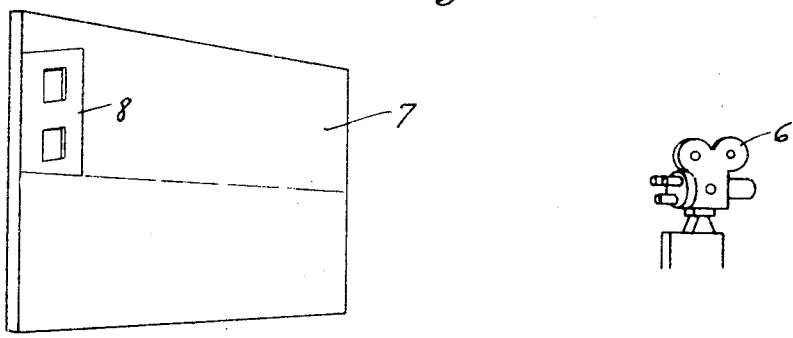

In the accompanying drawing, certain apparatus is shown illustrative of the steps followed in making a picture as outlined herein, in which:

Fig. 1 is a view showing a positive film containing the component of a photograph wherein the action is taking place; Fig. 2 is a perspective view of apparatus for projecting the photograph shown in Fig. 1 preliminary to artificially producing the other component; and Fig. 3 is a perspective view of the apparatus shown in Fig. 2, with the artificial component completed and ready for photographing upon a film.

This invention contemplates the composition by combining printing and exposure. The specific picture which is herein described as being produced has been selected merely for the purpose of illustrating the invention in a simplified form. The picture consists of an action wherein one man pursues another through the doorway of a building. The building to be shown is one of several stories, but the action can best be produced in the foreground of a set having only the lower part of the building. The upper part of the building will be supplied by a drawing or picture.

In accordance with the invention, the action and set are photographed with the upper part of each frame masked. A positive is made and appears as shown in Fig. 1, wherein the photographed portion is indicated by 4 and the masked portion by 5. The masked portion shows in the positive as a transparent field. By my improved process the positive is projected from the camera 6 upon a reflector screen 7, preferably a white screen. While so projected, the picture on the screen is completed by outlining the upper portion of the building as indicated by 8. This step is illustrated in Fig. 2. The artificial component part may now be completed by drawing in any of the details. This may be done while the picture is still being projected or after the outline has been drawn in.

There are a number of optional methods of procedure from this point. However, I prefer to proceed in the following manner: A positive of the artificial component is made and the lower portion of each of the frames covered with an opaque coating. This may be done at the time the artificial component is photographed by coating the lower portion of the screen below the line of demarcation with a light nonreflective material as by blackening the screen. Thereupon the screen may be photographed and a positive made thereof. This positive has only the artificial picture thereof, the lower portion thereof being in effect masked. A positive of the real component has the masked portion correspondingly covered with an opaque coating. A composite negative may now be made by printing onto a sensitized film first from one positive and then from the other.

Another method consists in placing the positive of the real component over a sensitized film, the upper portion of the positive being left in its transparent condition. An exposure is made as illustrated in Fig. 3. The artificial component is photographed upon the sensitized film, while the animate or real component is printed through the positive by reason of the reflection of the light from the screen. Still another variation consists in photographing the artificial component with the lower portion of the sensitized film masked. Negatives could then be made of the real and artificial components and double printing resorted to for obtaining the final picture.

The steps may also be reversed. For illustration, a still photograph of a background may be used for making a component of the ultimate picture. This component may be photographed upon a moving picture film, a portion thereof being masked. A positive is now made and a perspective projection is made upon a stage to locate parts of the set which are to be used for the objective of the other component. This permits accurate registration. The set is built and action therein photographed, masking the portion of the film corresponding to the other component. The remaining steps are obvious.

What I claim is:

1. The herein described method of making pictures, which consists in making a positive of a real component portion of a selective scene having only part of the desired background, projecting said positive through a lens upon a screen, completing the projected picture by drawing on said screen an artificial supplemental portion of the background to register and blend with the projected real component portion, photographing said artificial supplemental portion and making a composite print of the real and artificial photographs.

2. The herein described method of making pictures, which consists in masking a portion of a sensitized film, photographing on the exposed surface a real component portion of a selected scene having only part of the desired background, making a positive therefrom, projecting said positive through a lens upon a screen, completing the projected picture by drawing on said screen an artificial supplemental portion of the background to register and blend with the projected real component portion, photographing said artificial supplemental portion, and making a positive print of the real and artificial photographs.

3. The herein described method of making pictures consisting of making a positive of a real component portion of a selected scene having only part of the desired background, projecting said positive through a lens upon a screen, completing the projected picture by drawing on said screen an artificial supplemental portion of the background to register and blend with the projected real component portion, photographing said artificial supplemental portion, making a positive therefrom with the area of the real component portion opaque, making a positive of the real component portion with the area of the artificial supplemental portion opaque, and making a negative from said positives on a single film by first printing one positive and then printing the other positive thereon.

4. The herein described method of making pictures, which consists in masking a portion of a sensitized film, photographing on the exposed surface a real component portion of a selected scene having only part of the desired background, making a positive therefrom, projecting said positive through a lens upon a screen, completing the projected picture by drawing on said screen the remaining supplemental portion of the background to register and blend with the projected real component portion, photographing said artificial supplemental portion, making a positive therefrom with the area of the real component portion opaque, making a positive of the real component portion with the area of the artificial supplemental portion opaque, and making a negative from said positive on a single film by first printing one positive thereon, and then printing the other positive thereon.

In witness that I claim the foregoing I have hereunto subscribed my name this 23rd day of February, 1924.

FRANK D. WILLIAMS.